United States Patent
Crary et al.

(10) Patent No.: US 9,293,064 B2
(45) Date of Patent: Mar. 22, 2016

(54) SIMULATED MEDICAL DEVICE

(71) Applicant: Pocket Nurse Enterprises, Inc., Monaca, PA (US)

(72) Inventors: Wendy M Crary, Cambria, WI (US); Anthony J Battaglia, Hookstown, PA (US)

(73) Assignee: Pocket Nurse Enterprises, Inc., Monaca, PA (US)

( * ) Notice: Subject to any disclaimer, the term of this patent is extended or adjusted under 35 U.S.C. 154(b) by 267 days.

(21) Appl. No.: 14/169,516

(22) Filed: Jan. 31, 2014

(65) Prior Publication Data

US 2014/0308642 A1     Oct. 16, 2014

Related U.S. Application Data

(60) Provisional application No. 61/810,420, filed on Apr. 10, 2013.

(51) Int. Cl.
*G09B 23/28* (2006.01)

(52) U.S. Cl.
CPC ..................... *G09B 23/28* (2013.01)

(58) Field of Classification Search
CPC .... G09B 23/28; G09B 23/281; G09B 23/283; G09B 23/285; G09B 23/288; G09B 23/30; G09B 23/32; G09B 23/36; A61B 19/50; A61B 5/0008; A61B 8/12; G06F 19/3437
See application file for complete search history.

(56) References Cited

U.S. PATENT DOCUMENTS

| | | | | |
|---|---|---|---|---|
| 4,459,113 A | * | 7/1984 | Boscaro Gatti | G09B 23/285 434/272 |
| 2005/0084831 A1 | * | 4/2005 | Ison | G09B 23/28 434/219 |
| 2014/0065589 A1 | * | 3/2014 | Zamierowski | G09B 23/30 434/267 |

* cited by examiner

*Primary Examiner* — Timothy A Musselman
(74) *Attorney, Agent, or Firm* — The Webb Law Firm

(57) ABSTRACT

A simulated medical device may include a visual display, a processor, a memory, a switch connected to a power supply, a body housing the visual display, the processor, the memory, and the switch, and a simulated probe coupled to the body. The body is configured to receive internally at least a portion of the simulated probe. The switch is configured to provide a supply of power to the processor when the at least a portion of the simulated probe is external to the body and to disconnect the supply of power to the processor if the at least a portion of the simulated probe is inserted in the body. The processor is configured to cause the visual display to display at least a first simulated medical value in response to receiving the supply of power at the processor and after a time duration indicated by a simulated acquisition time.

20 Claims, 2 Drawing Sheets

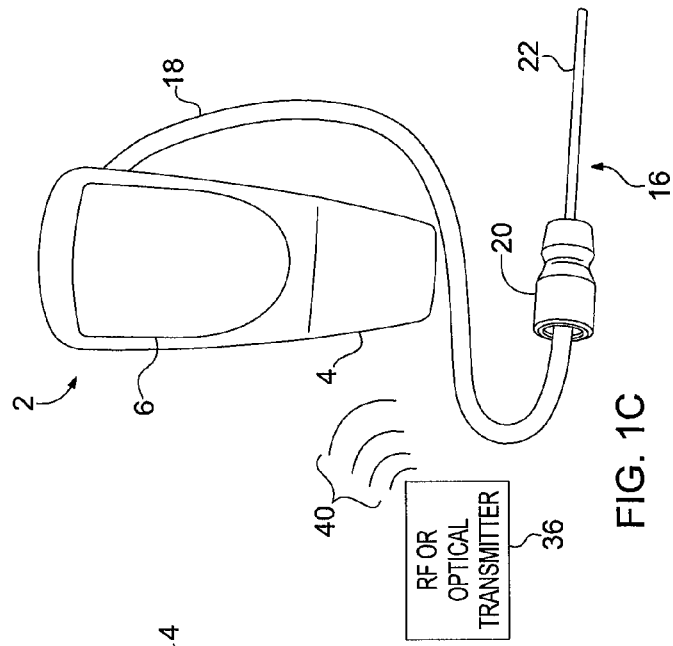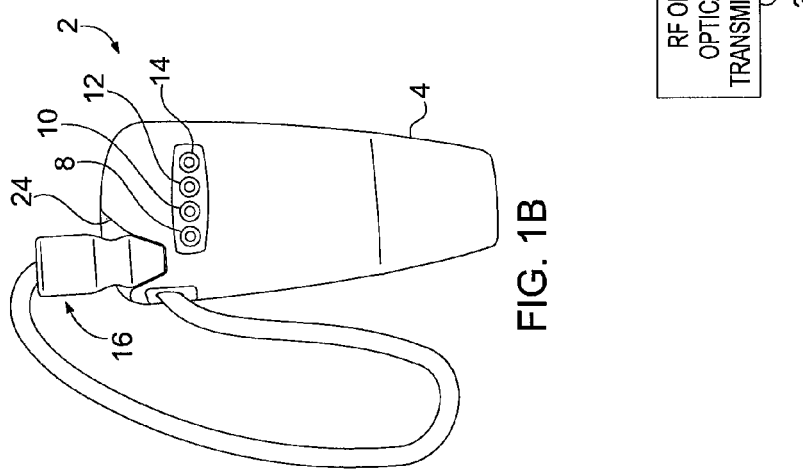

SIMULATED MEDICAL DEVICE

CROSS REFERENCE TO RELATED APPLICATIONS

This application claims the benefit of U.S. Provisional Application No. 61/810,420, filed Apr. 10, 2013, the disclosure of which is hereby incorporated in its entirety by reference.

BACKGROUND OF THE INVENTION

1. Field of the Invention

Preferred and non-limiting embodiments are related to a device for simulating medical values and, in particular, to a device for simulating medical values, such as temperature, blood glucose, pulse oximetry, and the like, to provide a realistic training environment for health care or patient care providers.

2. Description of Related Art

Health care or patient care providers must be trained to use various medical devices and to perform diagnosis and treatment of patients. However, an individual playing the role of a patient in a training scenario cannot actually exhibit the vital signs or symptoms of a medical condition. For example, a patient actor cannot fake a high temperature or high blood pressure reading. Moreover, the patient actor cannot truly respond to a treatment regimen such that their physical condition or vitals react to the treatment.

Furthermore, actual medical devices used for treating patients in real medical scenarios are often prohibitively expensive or otherwise unavailable for use in training situations. Moreover, these devices are configured to generate true readings and measurements, not provide readings or measurements for a specific training scenario. Health care or patient care providers, however, must still learn to use these devices to diagnosis and treat patients.

SUMMARY OF THE INVENTION

Generally, provided is a device for simulating a medical value that provides a realistic training environment for health care or patient care providers. Preferably provided is a device for simulating medical values, such as temperature, blood glucose, pulse oximetry, and the like, that is configured to provide readings or measurements for one or more training scenarios. Preferably provided is a simulated medical device that is less expensive to produce and/or operate than a corresponding medical device that performs in real medical situations the readings or measurements simulated by the simulated device.

According to a preferred and non-limiting embodiment, a simulated medical device for providing a realistic training environment for health care or patient care providers may include a visual display; a processor; a memory; a switch connected to a power supply; a body housing the visual display, the processor, the memory, and the switch; and a simulated probe coupled to the body. The body is configured to receive internally at least a portion of the simulated probe. The switch is configured to provide a supply of power to the processor from the power supply when the at least a portion of the simulated probe is external to the body and to disconnect the supply of power to the processor from the power supply if the at least a portion of the simulated probe is inserted in the body. The memory is configured to store a plurality of simulated medical values and a simulated acquisition time. The processor is configured to cause the visual display to display at least a first simulated medical value of the plurality of simulated values in response to receiving the supply of power at the processor and after a time duration indicated by the simulated acquisition time.

The body may comprise an integral sheath configured to receive internally the at least a portion of the simulated probe. The switch is positioned in the integral sheath such that when the at least a portion of the simulated probe is external to the integral sheath the switch is in a closed state to provide the supply of power to the processor from the power supply and when the simulated probe is inserted in the integral sheath the switch is in an open state to disconnect the supply of power to the processor from the power supply.

The simulated medical device may further include a user interface configured to receive user input. The processor is configured to set values of the plurality of simulated medical values and the time duration of the simulated acquisition time based at least partly on the user input. The user interface may include a plurality of buttons accessible via at least one opening in the body.

The memory may be further configured to store a display mode of the visual display. The processor is configured to cause the visual display to display the at least a first simulated medical value of the plurality of simulated values based at least partly on the display mode.

The simulated probe may be coupled to the body via a coiled cable.

The simulated medical device may further include a receiver configured to receive wireless signals from an external transmitter. The processor is configured to set values of the plurality of simulated medical values and the time duration of the simulated acquisition time based at least partly on the wireless signals. The processor is configured to modify the values of the plurality of simulated medical values during the simulated acquisition time.

The processor may be configured to cause the visual display to cycle between display of the at least a first simulated medical value of the plurality of simulated values and display of at least one second simulated value of the plurality of simulated values each time the switch cycles from disconnecting the supply of power to the processor from the power supply to providing the supply of power to the processor from the power supply.

The simulated probe may include a simulated thermometer probe, and the plurality of simulated medical values may include simulated temperatures.

The simulated probe is disconnected from the processor and memory.

According to another preferred and non-limiting embodiment, a method for providing a realistic training environment for health care or patient care providers with a simulated medical device comprising a visual display, a processor, a memory, a switch connected to a power supply, a body housing the visual display, the processor, the memory, and the switch, and a simulated probe coupled to the body, wherein the body is configured to receive internally at least a portion of the simulated probe, may include storing, by the memory, a plurality of simulated medical values and a simulated acquisition time; providing, by the switch, a supply of power to the processor from the power supply in response to the at least a portion of the simulated probe being external to the body; displaying, by the processor on the visual display, at least a first simulated medical value of the plurality of simulated values in response to receiving the supply of power at the processor and after a time duration indicated by the simulated acquisition time; and disconnecting, by the switch, the supply of power to the processor from the power supply in response to the at least a portion of the simulated probe being inserted in the body.

The method may further include providing, by the switch, the supply of power to the processor from the power supply in response to the at least a portion of the simulated probe being external to the integral sheath by placing the switch in a closed state, and disconnecting, by the switch, the supply of power to the processor from the power supply in response to the simulated probe being inserted in the integral sheath by placing the switch in an open state.

The method may further include providing a user interface; receiving, by the user interface, user input from a user; and setting, by the processor, values of the plurality of simulated medical values and the time duration of the simulated acquisition time based at least partly on the user input.

The method may further include storing, by the memory, a display mode for the visual display; and displaying, by the processor on the visual display, the at least a first simulated medical value of the plurality of simulated values based at least partly on the display mode.

The method may further include receiving, by a receiver, wireless signals from an external transmitter; and setting, by the processor, values of the plurality of simulated medical values and the time duration of the simulated acquisition time based at least partly on the wireless signals.

The method may further include modifying, by the processor, the values of the plurality of simulated medical values during the simulated acquisition time.

The method may further include cycling, by the processor, between display on the visual display of the at least a first simulated medical value of the plurality of simulated values and display on the visual display of at least one second simulated value of the plurality of simulated values in response to each cycle of a plurality of cycles of the switch cycling from disconnecting the supply of power to the processor from the power supply to providing the supply of power to the processor from the power supply.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWING(S)

Further features and other objects and advantages will become apparent from the following detailed description made with reference to the drawings in which:

FIG. 1A is a front view of a simulated thermometer according to a preferred and non-limiting embodiment;

FIG. 1B is a back view of a simulated thermometer according to a preferred and non-limiting embodiment;

FIG. 1C is an expanded front view of a simulated thermometer according to a preferred and non-limiting embodiment.

DESCRIPTION OF THE INVENTION

Figure 2:
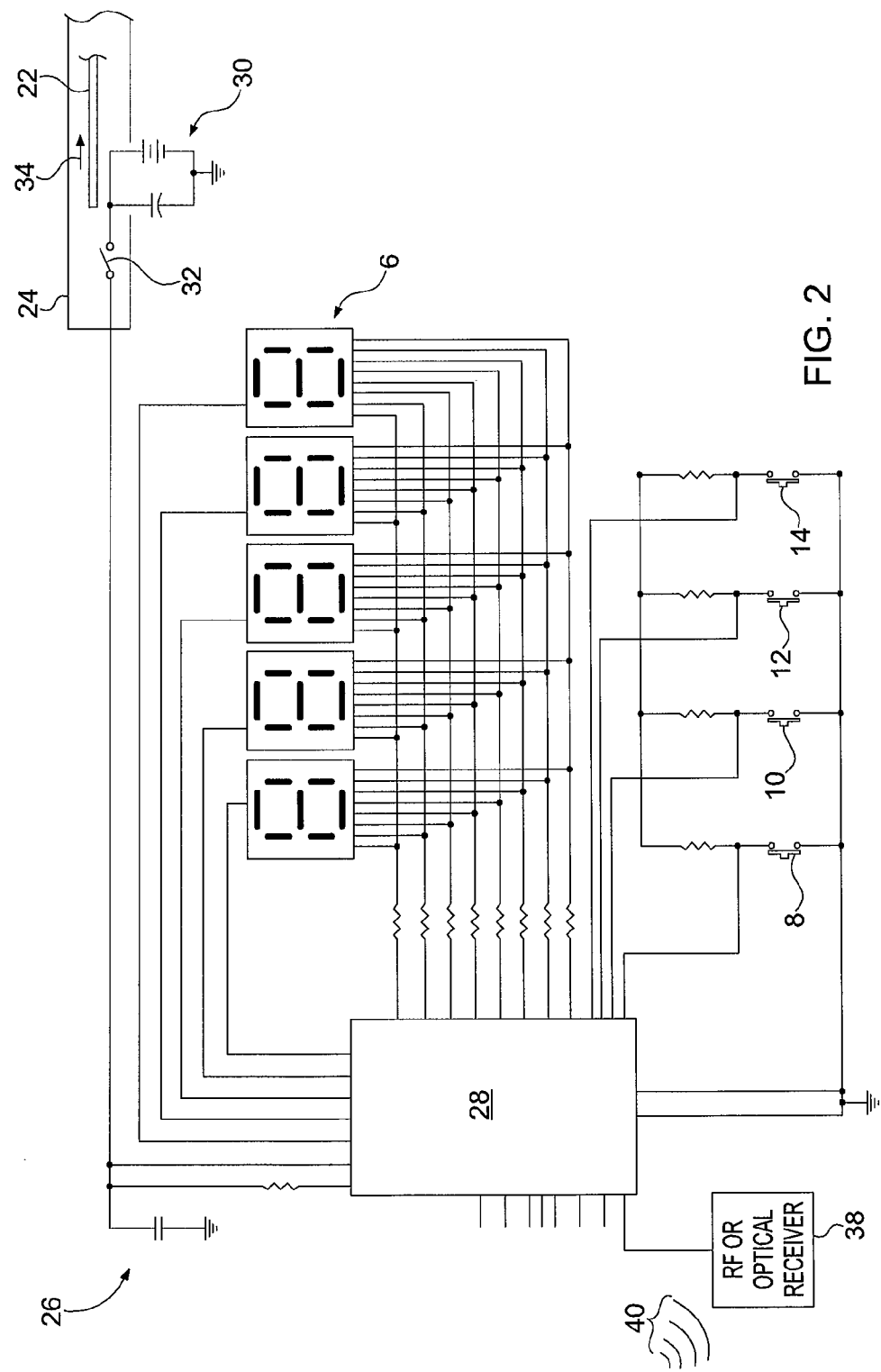
FIG. 2 is a circuit diagram of a simulated thermometer according to a preferred and non-limiting embodiment.

FIGS. 1A and 1B respectively show front and back views of a simulated thermometer 2. Although preferred and non-limiting embodiments are described below with respect to a simulated thermometer for the display of simulated temperatures, disclosed embodiments are not limited thereto, and it is further envisioned that simulated thermometer 2 may be configured to display other simulated values. The simulated thermometer 2 includes a body 4 which houses a printed circuit board (PCB) which supports circuitry including a visual display 6 which is visible through an opening in a front side of body 4. The PCB further supports a plurality of buttons or switches including a first button 8, a second button 10, a third button 12, and/or a fourth button 14. The first through fourth buttons 8-14 are accessible to a user of the simulated thermometer 2 via one or more openings on a back side of body 4.

With reference to FIG. 1C and with continuing reference to FIGS. 1A and 1B, the simulated thermometer 2 further includes a simulated thermometer probe 16, which is physically coupled to body 4 via a coiled cable 18. For reasons discussed hereinafter, the probe 16 is not coupled to any signal processing circuitry of the simulated thermometer 2. For example, the probe 16 is not configured to record or send any signal representative of a reading or measured value to the PCB for processing. The probe 16 has a proximal end 20 adapted to be held by the hand of the user and a distal end 22 that is similar in shape and size to an end of a conventional thermometer used for taking temperatures of patients. Because the probe 16 is not actually used for taking temperatures, the distal end 22 of probe 16 can be made of any suitable and/or desirable material that is, desirably, biocompatible.

The body 4 may include an optional integral sheath 24 for receiving the distal end 22 of probe 16 with the proximal end 20 supported above a mouth of the sheath 24. When it is desired to deploy the probe 16 from a position within sheath 24, a user grasps the proximal end 20 of probe 16 and pulls the distal end 22 out of the sheath 24.

Referring now to FIG. 2 and with continuing reference to FIGS. 1A-1C, circuitry 26 housed on the PCB within the body 4 includes an integrated control microprocessor 28, which is coupled to visual display 6 and the first through fourth buttons 8-14. The microprocessor 28 is connected to a DC power supply 30 via a switch 32. The circuitry 26 further includes biasing resistors and capacitors which are utilized in a manner known in the art, but which are not specifically described herein for the purpose of simplicity.

The visual display 6 may be any suitable and/or desirable form of display including an LED display, an LCD display, an OLED display, etc. In a preferred and non-limiting embodiment illustrated in FIG. 2, the visual display 6 comprises five 7-segment LEDs; however, preferred embodiments are not to be construed as limited thereto.

A switch 32 is positioned within sheath 24 such that when the distal end 22 of probe 16 is inserted into sheath 24, the distal end 22 of probe 16 causes the switch 32 to be in an open state. Upon removal of distal end 22 of probe 16 from the sheath 24, the switch 32 assumes a closed state completing an electrical path between the DC power supply 30 and the microprocessor 28.

The microprocessor 28 may be a completely integrated processor that includes an integral microprocessor, memory, input and output drivers, etc. as required in order to drive the visual display 6 and to receive and process inputs from the first through fourth buttons 8-14. The memory of microprocessor 28 is configured to store non-transitory computer readable program code that the processor of microprocessor 28 executes and runs under the control of.

In operation, in response to the removal of the probe 16 from the sheath 24, the switch 32 assumes its closed state connecting the DC power supply 30 to the microprocessor 28. In response to receiving power from the DC power supply 30, the processor of microprocessor 28, under the control of the non-transitory computer readable program code stored in the memory of microprocessor 28, initializes and commences operation in the manner next described.

In operation, upon closure of switch 32, the processor of microprocessor 28 initializes and causes the visual display 6 to display simulated temperatures that alternate or cycle between at least two programmed temperatures T1 and T2 each time the switch 32 cycles from an open state to a closed state. The simulated thermometer 2 is activated in response to removing the probe 16 from the sheath 24 whereupon the switch 32 cycles from an open state to a closed state and electrical power is supplied from the DC power supply 30 to the microprocessor 28. The DC power supply 30 may be any suitable and/or desirable form of DC power supply, including replaceable or rechargeable batteries.

In response to the microprocessor 28 powering on, the microprocessor thereof loads previously stored settings from the memory (e.g., an EEPROM) and, depending upon an acquisition time and a display mode, a temperature is displayed on the visual display 6. The displayed temperature is one of a plurality of different temperatures stored in the EEPROM, e.g., the temperature T1 or the temperature T2. The next time power is cycled to microprocessor 28, the other temperature T2 or T1 which is stored in the EEPROM is displayed on the visual display 6. The visual display 6 may be configured to display temperatures in degrees Celsius or Fahrenheit. For example, the rightmost LED in the visual display 6 shown in FIG. 2 may be configured to display a "C" for Celsius or a "F" for Fahrenheit.

The first through fourth buttons 8-14 may be utilized to program the microprocessor 28 with the values of the temperature T1 (e.g., first button 8), the temperature T2 (e.g., second button 10), the acquisition time (e.g., third button 12), and the display mode Celsius/Fahrenheit (C/F) (e.g., fourth button 14). For example, pressing or pressing and holding first button 8 causes temperature T1 stored in the memory (EEPROM) of microprocessor 28 to increase and be displayed on visual display 6 until a maximum temperature (e.g., 42° C. or 107° F.) is reached, whereupon temperature T1 rolls over to the lowest temperature to be displayed, e.g., 35° C. or 95° F.

Pressing or pressing and holding second button 10 causes temperature T2 stored in the memory of microprocessor 28 to increase and be displayed on visual display 6 to a maximum temperature (42° C. or 107° F.), whereupon the temperature rolls over to the lowest temperature, e.g., 35° C. or 95° F. In the case of first button 8 and second button 10, each press of the button can cause the corresponding temperature T1 and T2 stored in the memory of microprocessor 28 to increase by some predetermined value, e.g., 0.1° C. or 0.1° F., or pressing and holding each button can cause the corresponding temperature T1 and T2 to automatically increase by the predetermined value.

Pressing third button 12 causes the acquisition time stored in the memory of microprocessor 28 to increase until it reaches a maximum acquisition time, e.g., fifteen seconds, whereupon the acquisition time rolls over to a minimum acquisition time, e.g., five seconds. This acquisition time is the delay time between when probe 16 is removed from sheath 24 and the microprocessor 28 first receives power from DC power supply 30 until the time that a temperature T1 or T2 is displayed on the visual display 6. Each press of third button 12 can cause the acquisition time to change by a predetermined amount, e.g., 0.1 second or 1.0 second, or pressing and holding third button 12 can cause the acquisition time to automatically increase by the predetermined amount.

Each press of fourth button 14 cycles the display mode between Celsius and Fahrenheit.

Although programming of the microprocessor 28 is described above with respect to use of the first through fourth buttons 8-14, preferred embodiments are not limited thereto and the microprocessor 28 may be programmed through other user input means, for example, a touch screen control or graphical user interface (GUI). Moreover, although the first through fourth buttons 8-14 are described with respect to programming temperature values for the simulated thermometer 2, it is also envisioned that the buttons or other user interface may be configured to program other simulated values, such as blood glucose, pulse oximeter measurements, and the like.

The simulated thermometer 2 can be used in training scenarios of health care or patient care providers. An example user of the simulated thermometer 2 by health care or patient care providers in connection with an individual playing the role of a patient will now be described.

In this example, the person playing the role of the patient presents to the health care or patient care providers complaining of an elevated temperature, nausea and vomiting. It is to be appreciated that in this role playing scenario, the person playing the role of the patient does not have an elevated temperature, is not nauseous, and is not vomiting, but rather is simply complaining of these symptoms.

The health care or patient care providers perform a physical assessment of the patient including taking vital signs and the patient's temperature. One of these vital signs is simulated temperature(s) of the patient taken utilizing the simulated thermometer 2. In this regard, the probe 16 is removed from sheath 24, a probe cover (not shown) is placed over the distal end 22 of the probe 16, and the distal end 22 of the probe 16 with the probe cover in place is inserted into the mouth of the role playing patient. After a period of time determined by the acquisition time programmed into microprocessor 28 via the third button 12, the microprocessor 28 causes the visual display 6 to display the first programmed temperature T1, e.g., 103° F., as the first simulated temperature reading. It is to be appreciated that since probe 16 is not connected to any internal circuitry of simulated thermometer 2, the temperature experienced by the distal end 22 of probe 16 has no bearing on or relation to the temperature displayed on the visual display 6. Rather, the temperature T1 displayed on visual display is the temperature T1 that was programmed into the memory of the microprocessor 28.

After logging the displayed temperature T1 as well as any other vital signs of the role playing patient, the health care or patient care providers make a diagnosis based on the results of the vital signs, including the temperature displayed on the visual display 6, and other patient data made part of the simulation. After taking the first simulated temperature reading, the probe 16 is replaced into sheath 24 after removing the probe cover. Thereafter, the patient is given a course of treatment, albeit simulated or actual, by the health care or patient care providers based on the diagnosis.

After a period of time determined by the simulation, the health care or patient care providers take a second simulated temperature of the role playing patient by removing the probe 16 from the sheath 24, placing a probe cover (not shown) over the distal end 22 of probe 16, and again inserting the distal end 22 of probe 16 with the probe cover in place into the mouth of the role playing patient. After a period of time determined by the acquisition time programmed into microprocessor 28, the microprocessor 28 causes the visual display 6 to display the second temperature T2 programmed into the memory of microprocessor 28. Depending on the simulation, temperature T2 may be higher or lower than temperature T1. In this example, the temperature T2 displayed on the visual display 6 is 101.5° F., which is lower than temperature T1, i.e., 103° F. In response to taking this temperature, the health care or patient care providers may conclude that the health care or patient care providers' course of treatment is working.

As can be seen, cycling probe 16 into and out of sheath 24 causes the temperature that the microprocessor 28 displays on the visual display 6 to alternate between the temperature T1 and T2, which alternating temperatures can be utilized for the purpose of training health care or patient care providers. Again, it is to be appreciated that probe 16 is only a simulated probe and is not actually utilized to measure temperature.

According to another preferred and non-limiting embodiment, the simulated thermometer 2 may include a remote RF or optical transmitter 36 (FIG. 1C) and an RF or optical receiver 38 (FIG. 2) as an integral part of the simulated thermometer 2 for receiving radio frequency or optical signals 40 from the transmitter 36. The combination of transmitter 36 and receiver 38 can be utilized to remotely program the memory of microprocessor 28 with one or more values of temperature T1, temperature T2, and/or acquisition time, and/or to toggle the visual display 6 between Celsius and Fahrenheit. The combination of transmitter 36 and receiver 38 can either be utilized in addition or, alternatively, to buttons 8-14. However, it is envisioned that the functions provided by buttons 8-14 may be replaced with the combination of the transmitter 36 and the receiver 38.

One advantage of the use of the transmitter 36 and the receiver 38 includes the ability of an instructor participating in the role playing between a role playing patient and the health care or patient care providers to change the second display temperature based upon the health care or patient care providers' course of treatment of the patient. For example, assuming that the health care or patient care providers' treatment plan was appropriate, the instructor may chose to leave the second programmed temperature T2 at a lower value than the first programmed temperature T1, as discussed in the above example. However, if the health care or patient care providers make an incorrect diagnosis and prescribe an improper course of treatment, the instructor utilizing transmitter 36 may change the second temperature T2 to be the same or a higher temperature, e.g., 103.5° F., indicating that the course of treatment is not working. The combination of the transmitter 36 and the receiver 38 can be utilized to change any of the values programmed into the memory of microprocessor 28 at any time the microprocessor 28 is receiving power from DC power supply 30, including during the acquisition time preprogrammed into microprocessor 28.

The present invention has been described with reference to exemplary embodiments. Obvious modifications and alterations will occur to others upon reading and understanding the preceding detailed description. For example, while the present invention has been described in connection with the display of simulated temperatures, it is also envisioned that the simulated thermometer 2 could be configured to display other simulated values, such as blood glucose, blood pressure, pulse oximetry, and the like, and that the probe 16 may be replaced with suitable probes for these other measurements to provide a realistic training environment.

The invention claimed is:

1. A simulated medical device for providing a realistic training environment for health care or patient care providers, the device comprising:
    a visual display;
    a processor;
    a memory;
    a switch connected to a power supply;
    a body housing the visual display, the processor, the memory, and the switch; and
    a simulated probe coupled to the body,
    wherein the body is configured to receive internally at least a portion of the simulated probe,
    wherein the switch is configured to provide a supply of power to the processor from the power supply when the at least a portion of the simulated probe is external to the body and to disconnect the supply of power to the processor from the power supply if the at least a portion of the simulated probe is inserted in the body,
    wherein the memory is configured to store a plurality of simulated medical values and a simulated acquisition time, and
    wherein the processor is configured to cause the visual display to display at least a first simulated medical value of the plurality of simulated values in response to receiving the supply of power at the processor and after a time duration indicated by the simulated acquisition time.

2. The simulated medical device of claim 1, wherein the body comprises an integral sheath configured to receive internally the at least a portion of the simulated probe, and wherein the switch is positioned in the integral sheath such that when the at least a portion of the simulated probe is external to the integral sheath the switch is in a closed state to provide the supply of power to the processor from the power supply and when the simulated probe is inserted in the integral sheath the switch is in an open state to disconnect the supply of power to the processor from the power supply.

3. The simulated medical device of claim 1, further comprising a user interface configured to receive user input, and wherein the processor is configured to set values of the plurality of simulated medical values and the time duration of the simulated acquisition time based at least partly on the user input.

4. The simulated medical device of claim 3, wherein the user interface comprises a plurality of buttons accessible via at least one opening in the body.

5. The simulated medical device of claim 1, wherein the memory is further configured to store a display mode of the visual display, and wherein the processor is configured to cause the visual display to display the at least a first simulated medical value of the plurality of simulated values based at least partly on the display mode.

6. The simulated medical device of claim 1, wherein the simulated probe is coupled to the body via a coiled cable.

7. The simulated medical device of claim 1, further comprising a receiver configured to receive wireless signals from an external transmitter, wherein the processor is configured to set values of the plurality of simulated medical values and the time duration of the simulated acquisition time based at least partly on the wireless signals.

8. The simulated medical device of claim 7, wherein processor is configured to modify the values of the plurality of simulated medical values during the simulated acquisition time.

9. The simulated medical device of claim 1, wherein the processor is configured to cause the visual display to cycle between display of the at least a first simulated medical value of the plurality of simulated values and display of at least one second simulated value of the plurality of simulated values each time the switch cycles from disconnecting the supply of power to the processor from the power supply to providing the supply of power to the processor from the power supply.

10. The simulated medical device of claim 1, wherein the simulated probe comprises a simulated thermometer probe, and wherein the plurality of simulated medical values comprise simulated temperatures.

11. The simulated medical device of claim 1, wherein the simulated probe is disconnected from the processor and memory.

12. A method for providing a realistic training environment for health care or patient care providers with a simulated medical device comprising a visual display, a processor, a memory, a switch connected to a power supply, a body housing the visual display, the processor, the memory, and the switch, and a simulated probe coupled to the body, wherein the body is configured to receive internally at least a portion of the simulated probe, the method comprising:
  storing, by the memory, a plurality of simulated medical values and a simulated acquisition time;
  providing, by the switch, a supply of power to the processor from the power supply in response to the at least a portion of the simulated probe being external to the body;
  displaying, by the processor on the visual display, at least a first simulated medical value of the plurality of simulated values in response to receiving the supply of power at the processor and after a time duration indicated by the simulated acquisition time; and
  disconnecting, by the switch, the supply of power to the processor from the power supply in response to the at least a portion of the simulated probe being inserted in the body.

13. The method of claim 12, wherein the body comprises an integral sheath configured to receive internally the at least a portion of the simulated probe, and wherein the switch is positioned in the integral sheath, the method further comprising providing, by the switch, the supply of power to the processor from the power supply in response to the at least a portion of the simulated probe being external to the integral sheath by placing the switch in a closed state, and disconnecting, by the switch, the supply of power to the processor from the power supply in response to the simulated probe being inserted in the integral sheath by placing the switch in an open state.

14. The method of claim 12, further comprising
  providing a user interface;
  receiving, by the user interface, user input from a user; and
  setting, by the processor, values of the plurality of simulated medical values and the time duration of the simulated acquisition time based at least partly on the user input.

15. The method of claim 12, wherein the user interface comprises a plurality of buttons accessible via at least one opening in the body.

16. The method of claim 12, further comprising:
  storing, by the memory, a display mode for the visual display; and
  displaying, by the processor on the visual display, the at least a first simulated medical value of the plurality of simulated values based at least partly on the display mode.

17. The method of claim 12, further comprising:
  receiving, by a receiver, wireless signals from an external transmitter; and
  setting, by the processor, values of the plurality of simulated medical values and the time duration of the simulated acquisition time based at least partly on the wireless signals.

18. The method of claim 17, further comprising modifying, by the processor, the values of the plurality of simulated medical values during the simulated acquisition time.

19. The method of claim 12, cycling, by the processor, between display on the visual display of the at least a first simulated medical value of the plurality of simulated values and display on the visual display of at least one second simulated value of the plurality of simulated values in response to each cycle of a plurality of cycles of the switch cycling from disconnecting the supply of power to the processor from the power supply to providing the supply of power to the processor from the power supply.

20. A simulated medical device for providing a realistic training environment for health care or patient care providers, the device comprising:
  visual display means;
  processor means;
  memory means;
  switch means connected to power supply means;
  body means for housing the visual display means, the processor means, the memory means, and the switch means; and
  a simulated probe means for simulating a medical device probe coupled to the body means;
  wherein the body means comprises sheath means for receiving internally at least a portion of the simulated probe means,
  wherein the switch means provides a supply of power to the processor from the power supply means if the at least a portion of the simulated probe means is external to the sheath means and disconnects the supply of power to the processor means from the power supply means if the at least a portion of the simulated probe means is inserted in the sheath means,
  wherein the memory means is configured to store a plurality of simulated medical values and a simulated acquisition time, and
  wherein the processor means causes the visual display means to display at least a first simulated medical value of the plurality of simulated values in response to receiving the supply of power from the power supply means via the switch means and after a time duration indicated by the simulated acquisition time.

* * * * *